United States Patent
Joshi et al.

(10) Patent No.: US 11,954,012 B2
(45) Date of Patent: Apr. 9, 2024

(54) CLIENT-SIDE TELEMETRY DATA FILTER MODEL

(71) Applicant: Microsoft Technology Licensing, LLC, Redmond, WA (US)

(72) Inventors: Dhruv Joshi, Bellevue, WA (US); Dolly Sobhani, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/665,128

(22) Filed: Feb. 4, 2022

(65) Prior Publication Data
US 2023/0251953 A1    Aug. 10, 2023

(51) Int. Cl.
G06F 11/36    (2006.01)

(52) U.S. Cl.
CPC ........ G06F 11/366 (2013.01); G06F 11/3612 (2013.01)

(58) Field of Classification Search
CPC ........................... G06F 11/366; G06F 11/3612
See application file for complete search history.

(56) References Cited

U.S. PATENT DOCUMENTS

| | | | |
|---|---|---|---|
| 7,962,797 B2 | 6/2011 | Goldszmidt et al. | |
| 8,909,990 B2* | 12/2014 | Davis .................... | G06F 11/366 714/37 |
| 2005/0228880 A1* | 10/2005 | Champlin ........... | G06F 11/3495 709/224 |
| 2007/0192150 A1* | 8/2007 | Belkin ................... | G06Q 10/06 370/242 |
| 2007/0294591 A1* | 12/2007 | Usynin ............... | G06F 11/0751 714/45 |
| 2008/0267076 A1* | 10/2008 | Laperi .................. | H04M 11/062 370/242 |
| 2012/0216077 A1* | 8/2012 | Christensen ........ | G06F 11/3612 714/38.1 |
| 2015/0019512 A1 | 1/2015 | Basak et al. | |
| 2016/0204992 A1 | 7/2016 | Gurevich et al. | |
| 2016/0321588 A1 | 11/2016 | König et al. | |
| 2017/0250855 A1* | 8/2017 | Patil ...................... | H04L 47/827 |
| 2020/0034283 A1* | 1/2020 | Chatterjee .......... | G06Q 10/0639 |
| 2021/0182126 A1* | 6/2021 | Walters ............... | G06F 11/3684 |
| 2021/0406147 A1 | 12/2021 | Li et al. | |

OTHER PUBLICATIONS

Alves et al., "Identifying Relevant Data Center Telemetry Using Change Point Detection", published by IEEE, 2020 IEEE 9th International Conference on Cloud Networking (CloudNet), pp. 1-4 (Year: 2020).*

"International Search Report and Written Opinion Issued in PCT Application No. PCT/US22/048337", dated Feb. 28, 2023, 14 Pages.

* cited by examiner

Primary Examiner — S. Sough
Assistant Examiner — Zheng Wei
(74) Attorney, Agent, or Firm — Schwegman Lundberg & Woessner, P.A.

(57) ABSTRACT

A method may include detecting an error during execution of a function of an application executing on a system; inputting an identifier of the error into a first client-side telemetry data filter model; based on the inputting, receiving an output value from the first client-side telemetry data filter model; determining that the output value is above an importance threshold; and in response to the determining, transmitting telemetry data associated with the error to a server computing device.

17 Claims, 6 Drawing Sheets

CLIENT-SIDE TELEMETRY DATA FILTER MODEL

BACKGROUND

Collecting telemetry data (e.g., event data including user actions, process data, system state information, etc.) for computer applications is an important part of application management. When telemetry data from multiple users is combined, the severity of a bug in the application that needs to be corrected may be determined.

One of the problems in collecting telemetry data is privacy data regulations limit the ability for data to be exported. Thus, there may be data collected for one region that may not be used with another region—thereby compromising the ability to obtain a complete picture of application problems. Another problem is that as the users of an application increase, the amount of telemetry data increases as well.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
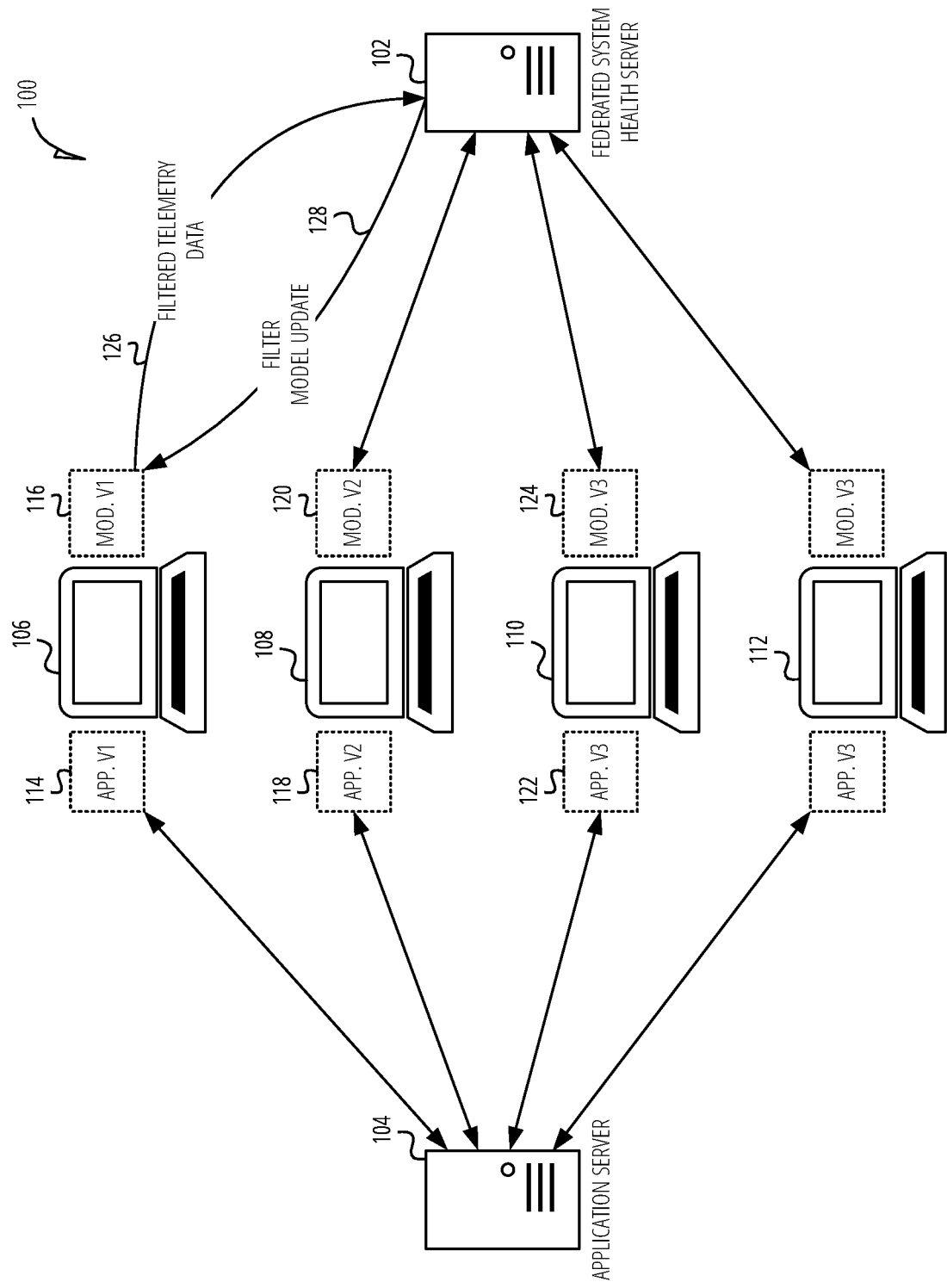
FIG. 1 is a schematic diagram of a system for managing application telemetry data, according to various examples.

In the following description, for purposes of explanation, numerous specific details are set forth to provide a thorough understanding of various examples. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have default values should a specific value not be described. User interfaces may be provided for an end-user or administrator to edit the variable values in some instances.

Collecting telemetry data has several challenges. For example, one problem is the amount of data that is collected. A client may be executing a client-side application, such as MICROSOFT WORD® software, as opposed to a web-based application. As it executes, telemetry data is transmitted to a server. The server may store the telemetry data and process the data. The output of the processing may be one or more metrics. One set of metrics may be system health metrics. The health metrics may indicate whether (and with what error) an application has crashed or if a file was saved correctly, among others.

Each feature of an application may have its own process for indicating failure or success. Thus, when an application performs an operation, it may generate event data (an abstracted version of telemetry data that indicates an event has occurred within the application) about the operation that is transmitted to the server. Accordingly, the number of resources such as processing power, storage devices, and network bandwidth, grows proportional to the amount of event data collected. When there is a large increase in users, the lack of commensurate increase in resources on the server hinders the ability to quickly process the telemetry data.

Another problem relates to data privacy rules. As more data privacy regulations are being enacted around the world, not all data is exportable from one region to another. Instead, regulations are limiting data to certain geographic boundaries. One such regulation is the General Data Protection Regulation (GDPR) for the European Union (EU). The GDPR indicates that all personal user data is subject to additional control requirements such as letting a user opt-out of sharing the data.

The lack of seamless data export creates its own set of challenges. For example, complying with the regulations potentially results in different system health metrics for the same application depending on the region—despite the application being the same. With divergent health metrics it is difficult to determine what baseline to use to measure system health.

In view of the above technical and logistical challenges, this disclosure details a federated system that utilizes a combination of a server-side model and client-side model for each build of the application. The client-side model performs processing of the telemetry data before it is transmitted to a server. The server-side model determines what the average health is for that build across the clients. Each client may store a model, managed by the server, that limits what events get transmitted to the server.

The server may manage the client models and update them based on the events that are ultimately received. For example, a new build—as identified by a value (e.g., "v8 build 12389")—of the application may be pushed out to several clients. The new build may include a new bug that crashes the application on a file save. Once the server collects enough reports to have a high confidence that the bug is significant and intrinsic to the application (as opposed to a one-off error), the client-side model for that build may be updated to indicate that the bug should no longer be reported until an update to the application has been pushed out that corrects the error.

The system described above—and in further detail below—provides several improvements to error reporting computing system processes. For example, the use of client processing via the client-side model reduces the volume of telemetry data that needs to be transmitted and processed. The ability to dynamically update the client-side model also leads to further reduction in telemetry data processing. Additionally, the client-side model also alleviates many of the data privacy problems that arise with regional silos of data because the client-side model is not associated with a person, but rather an application build. Further benefits of the described system may be evident upon of analysis of this disclosure to one skilled in the art.

FIG. 1 is a schematic diagram 100 of a system for managing application telemetry data, according to various examples. The diagram includes a federated system health server 102, an application server 104, a client device 106, a client device 108, a client device 110, a client device 112, an application 114, a telemetry filter model 116, an application 118, a telemetry filter model 120, an application 122, a telemetry filter model 124, a filtered telemetry data 126, and a filter model update 128.

In various examples, client device 106—and similarly client device 108, client device 110, and client device 112—may be but is not limited to, a smartphone, tablet, laptop, multi-processor system, microprocessor-based or programmable consumer electronics, game console, set-top box, or other device that a user utilizes to communicate over a network. In various examples, a client device includes a display module (not shown) to display information (e.g., in the form of specially configured user interfaces). In some embodiments, computing devices may comprise one or more of a touch screen, camera, keyboard, microphone, or Global Positioning System (GPS) device.

Figure 2:
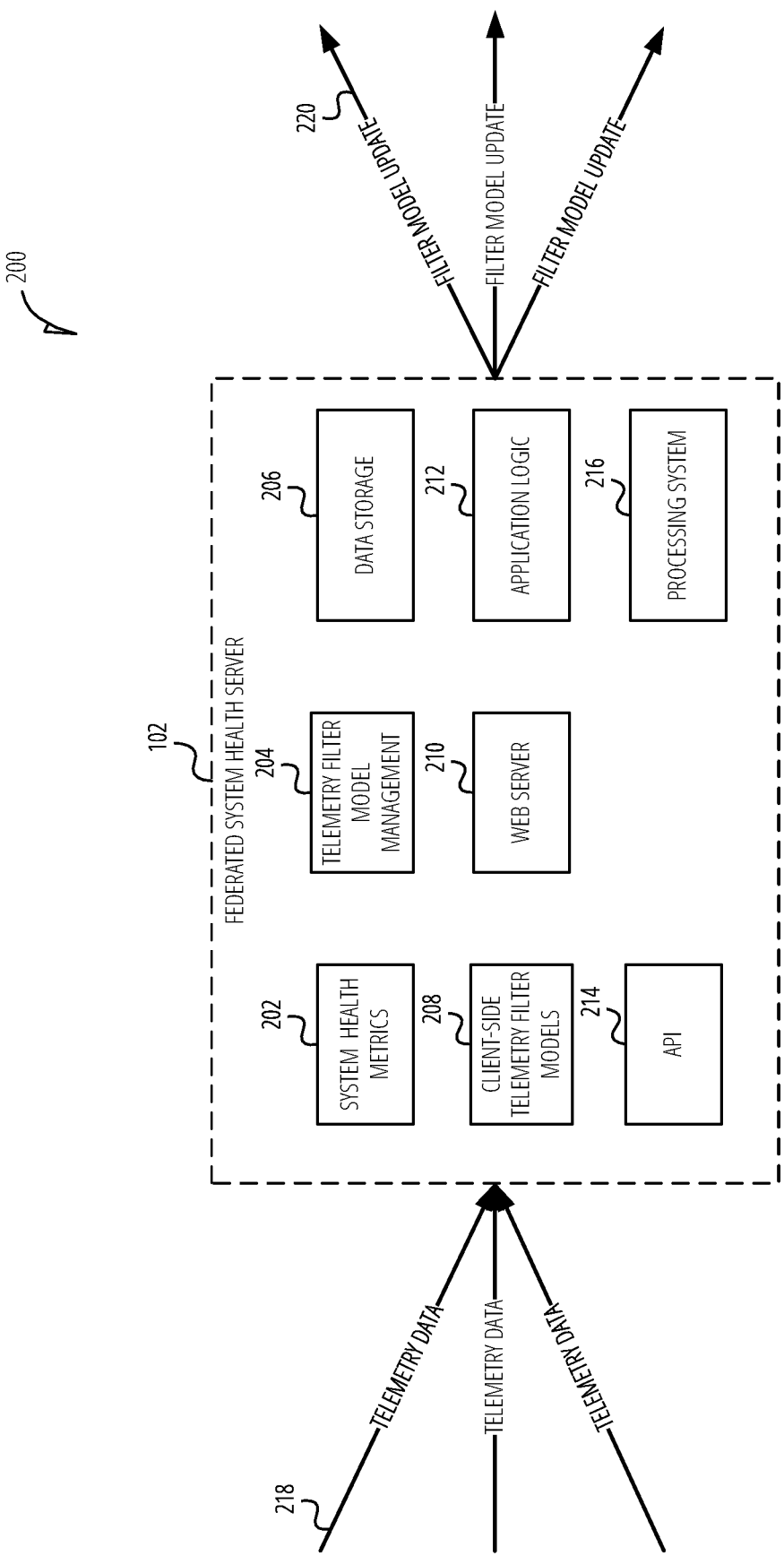
FIG. 2 is a schematic diagram of components in a federated system health server, according to various examples.

Federated system health server 102—as discussed in more detail with respect to FIG. 2—may manage, update, and distribute (e.g., filtered telemetry data 126) the client-side telemetry filter models to the client devices. Additionally, federated system health server 102 may maintain system health metrics for each build of the application. Application server 104 may be a computing device that distributes application builds to the client devices. Although illustrated as separate from federated system health server 102, the functions of application server 104 and federated system health server 102 may be performed by the same set of processors.

Different client devices may have different application versions and model versions. Each application version may be for a different build of the application as described above. A model version may be specific to an application version or common to multiple builds. Additionally, the same application version may have different versions of the model. Using multiple models for the same build may be useful in A/B testing or to increase/decrease the volume of telemetry data reporting.

Diagram 100 indicates the use of one model version per application version. Thus, application 114 is version one as well as corresponding telemetry filter model 116. Similarly, application 118 is for version two, as is telemetry filter model 120, and application 122 is for version three as well as telemetry filter model 124.

Application server 104, client devices 106, 108, 110, 112, and federated system health server 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

A client device, such as client device 106, may transmit filtered telemetry data 126 based on use of telemetry filter model 116. For example, application 114 may execute on client device 106 and an error may be reported by the application 114. An error may or may not be visible to the user. Visible errors may include the application failing to perform a requested function or not responding to user input. Non-visible errors may be code within an application build that returns an unexpected result that triggers halting of the application or an unexpected result that the application recovers from without knowledge by the user. Data associated with the error may be run through telemetry filter model 116 to determine if filtered telemetry data 126 should be sent to federated system health server 102. This process is described in more detail in FIG. 3 and FIG. 4. In various examples, all logging data collected by the application on the client device is run through the model regardless of an error is detected.

FIG. 2 is a schematic diagram 200 of components in a federated system health server 102, according to various examples. The system comprises a federated system health server 102 that includes a system health metrics 202, a telemetry filter model management 204, a data storage 206, a client-side telemetry filter models 208, a web server 210, an application logic 212, an API 214, a processing system 216. Federated system health server 102 also includes an input of a telemetry data 218 and an output of a filter model update 220.

Federated system health server 102 is illustrated as set of separate elements (e.g., system health metrics 202, telemetry filter model management 204, application logic 212, etc.). However, the described functionality attributable to a single element may be performed by another element. Likewise, the elements may be combined into one more or other elements. An element may represent computer program code that is executable by processing system 216. The program code may be stored on a storage device (e.g., data storage 206) and loaded into a memory of processing system 216 for execution. Portions of the program code may be executed in a parallel across multiple processing units (e.g., a core of a general-purpose computer processor, a graphical processing unit, an application specific integrated circuit, etc.) of data storage 206. Execution of the code may be performed on a single device or distributed across multiple devices. In some examples, the program code may be executed on a cloud platform (e.g., MICROSOFT AZURE® and AMAZON EC2®) using shared computing infrastructure.

Data storage 206 may store data that is used by federated system health server 102. Data storage 206 is depicted as singular element but may be multiple data stores. The specific storage layout and model used by data storages 206 may take several forms—indeed, data storage 206 may utilize multiple models. Data storage 206 may be, but is not limited to, a relational database (e.g., SQL), non-relational database (NoSQL) a flat file database, object model, document details model, graph database, shared ledger (e.g., blockchain), or a file system hierarchy. Data storage 206 may store data on one or more storage devices (e.g., a hard disk, random access memory (RAM), etc.). The storage devices may be in standalone arrays, part of one or more servers, and may be in one or more geographic areas.

Federated system health server 102 may communicated with client devices and application servers through an Application Programming Interface (e.g., API 214). An API provides a method for computing processes to exchange data. A web-based API (e.g., such as API 214) may permit communications between two or more computing devices such as client device 106 and federated system health server 102. The API may define a set of HTTP calls according to Representational State Transfer (RESTful) practices. For examples, A RESTful API may define various GET, PUT, POST, DELETE methods to create, replace, update, and delete data stored in a Database (e.g., data store 206). Accordingly, client device 106 may transmit filtered telemetry data to federated system health server 102 via the API.

To further support network communications, federated system health server 102 may include web server 210. Web server 210 may implement API 214 for receiving an and transmitting data to client devices. Although generally discussed in the context of delivering webpages via the Hypertext Transfer Protocol (HTTP), other network protocols may be utilized by web server 210 (e.g., File Transfer Protocol, Telnet, Secure Shell, etc.) to transmit and receive data.

Web server 210 may also implement an application as defined by application logic 212. Application logic 212 may include computer-executable instructions that define one or more user interfaces for system administrators to review and edit data in federated system health server 102. For example, a dashboard of system health metrics 202 may be presented. Based on the metrics, the user may update a telemetry filter model for the associated application build, as discussed in more detail below.

An administrative user (e.g., a software engineer that maintains the application) may enter in a uniform resource identifier (URI) into a web client on their computing device (e.g., the INTERNET EXPLORER® web browser by Microsoft Corporation or SAFARI® web browser by Apple Inc.) that corresponds (via a domain name server) a logical location (e.g., an Internet Protocol address) of web server 210. In response, web server 210 may transmit a web page that is rendered on a display device of the computing device. Web server 210 may enable the user to interact with one or more web applications provided in a transmitted web page to view and modify data in the models. In various examples, the models may be update automatically based on application logic 212 without user input.

Additionally, application logic 212 may coordinate system health metrics 202, telemetry filter model management 204, and client-side telemetry filter models 208 to perform the functionality described herein. For example, application logic 212 may issue API calls to retrieve system health metrics 202 from data storage 206, transmit it for display on a display device, receive an update to a model from client-side telemetry filter models 208 and transmit the updated model to one or more client devices.

System health metrics 202 may include a system health model for each build of an application. The system health model may be based on telemetry data received from client devices that are executing the build of the application. For example, the system health model may indicate which errors are occurring and the frequency that they occur. The initial values in of a system heath model may leverage historical error rates of past builds. Telemetry data may include, but is not limited to log data, operating system data, device information, chipset, application build information, locale, application state during the error (e.g., file save, new document, user interface elements used, etc.). In various examples, the telemetry data may be separated into two groupings, event data and metadata. The event data may include data collected by the application such as the log data and application state, and metadata may include environmental factors such as operating system, application build information, chipset, etc.

The system health model may be used to determine the best course of action with respect to the most frequent errors for the application build. For example, each function of an application build may have an associated user identifier. For the most frequently occurring errors (such as the top 10) an automatic notification may be transmitted to the software engineer to work on the problems. Furthermore, federated system health server 102 may automatically update the client-side telemetry filter model for that particular application build to stop reporting on these errors until a new application build has been pushed out to the various client devices. The instructions to stop reporting may be explicit (e.g., ignore this error type) or relative based on weights of the error or a baseline frequency of the error.

Client-side telemetry filter models 208 represent the various telemetry filter models for each application build. For example, with respect to FIG. 1, the telemetry filter model for application 114 may be telemetry filter model 116. The models themselves may be stored within data storage 206. Telemetry filter model management 204 executes functions with respect to distributing the models to the client devices as well as processing telemetry data received from the client devices.

A model may take many forms. For example, the model may be a weighted vector with each component in the vector representing the relative importance of an error for a given application build. As an example, consider a three-component vector where each component is associated with a particular function of an application (e.g., application 114). When the application crashes or code of the application otherwise indicates a problem with the function an input vector may be generated to apply to the telemetry filter model. For example, the application may generate an input vector with a '1' in the component place that corresponds with the problem function.

More complex multidimensional models may be used that take into consideration and values of the parameters within the application as well. Accordingly, an error with a code of '632' may only be suppressed if the operating system also is a certain version. This may be useful if a particular operating system version is reporting a higher proportional share of error 632 than other versions. Thus, other versions of the operating system may continue to report the error, but the overall volume of telemetry data may be reduced.

In other examples, the data may indicate a "normal" frequency of an error, and if the error is occurring more than this frequency, the error may be reported but otherwise is suppressed. For example, it may be known that 0.5% of the time a file save error may fail. Over a period of time, file save error data may be collected by the client device. When the frequency of the file save error exceeds 0.5%, the error may be reported to federated system health server 102. Once a certain threshold (e.g., statistically significant) of reports come in from a number of different client devices, system health metrics 202 may be updated for the build to indicate a new expected frequency of file save errors—at which point the client-side models may be updated. Thus, the client devices would no longer report the file-save error unless it exceeded the new baseline failure rate as indicated by the updated client-side model for the build.

Figure 4:
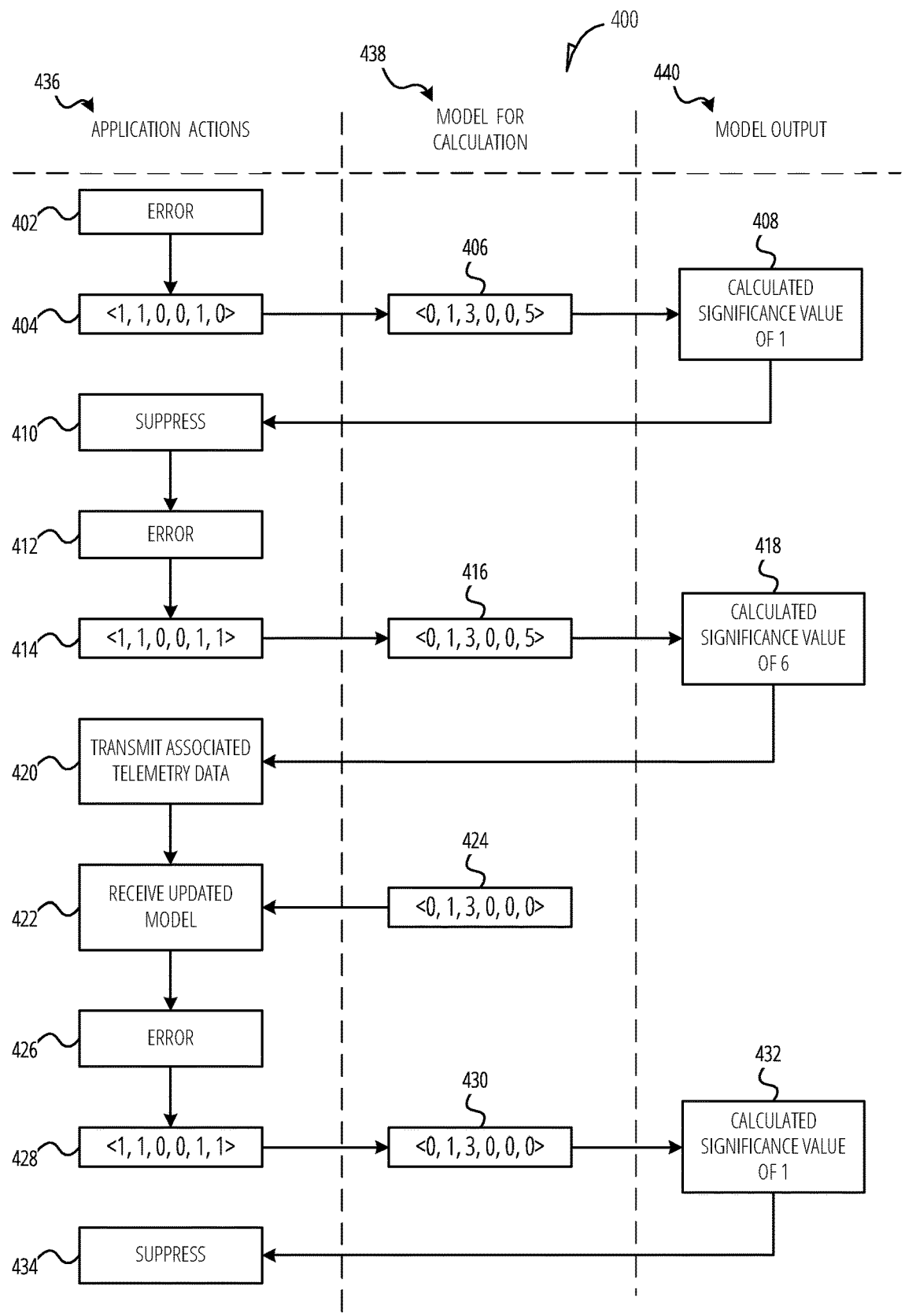
FIG. 4 is a flowchart diagram illustrating a method for processing application errors, according to various examples.

The calculation used with respect to the model in FIG. 4 is a dot product but, other models and calculation types may be used without departing from the scope of this disclosure. Model types may include, but are not limited it, cosign similarity, linear regression, logistic regression, decision trees, k-nearest neighbors, and random forest models.

Telemetry filter model management 204 may use a push delivery model, in various examples. For example, data storage 206 may include a database table where each row is for a different application version. A column in the table may include an identifier of the latest telemetry filter model the application version. When an update to column for the application version is received, telemetry filter model management 204 may transmit a notification to the client devices that currently have the associated application version installed. The notification may include an instruction for the application to transmit a request to receive the updated telemetry filter model. Additionally, when a client device receives a new version of the application telemetry filter model management 204 may push the associated telemetry filter model for the new version.

Telemetry filter model management 204 may also use a pull delivery model. For example, when an application installed on a client device begins execution, the application may transmit a request to federated system health server 102 to determine if an update to the telemetry filter model has been made since the previous launch of the application.

Telemetry filter model management 204 may also include logic (e.g., if/then rules, weighted factors, etc.) for updating the models themselves. The relative weight for a component of the model may be automatically updated based on one or more factors. These factors may include, but are not limited to, if a "ticket" for the error has already been generated (e.g., if a ticket exists, the weight of the error may be decreased), the frequency of reporting of the error, the percentage of client devices reporting the error, the length of time between error reports, and whether the error is part of system health metrics 202. Additionally, these factors may be applied in a more granular fashion by considering the geographic region of the reporting client device.

In addition to automatic updating based on logic, federated system health server 102 may also provide user interfaces to update the models. For example, a user may query system health metrics 202 to determine the most frequent error being reported for a build, generate a ticket, and then update the model to lower the importance of the error—or indicate the error should not be reported again until a new application version.

Figure 3:
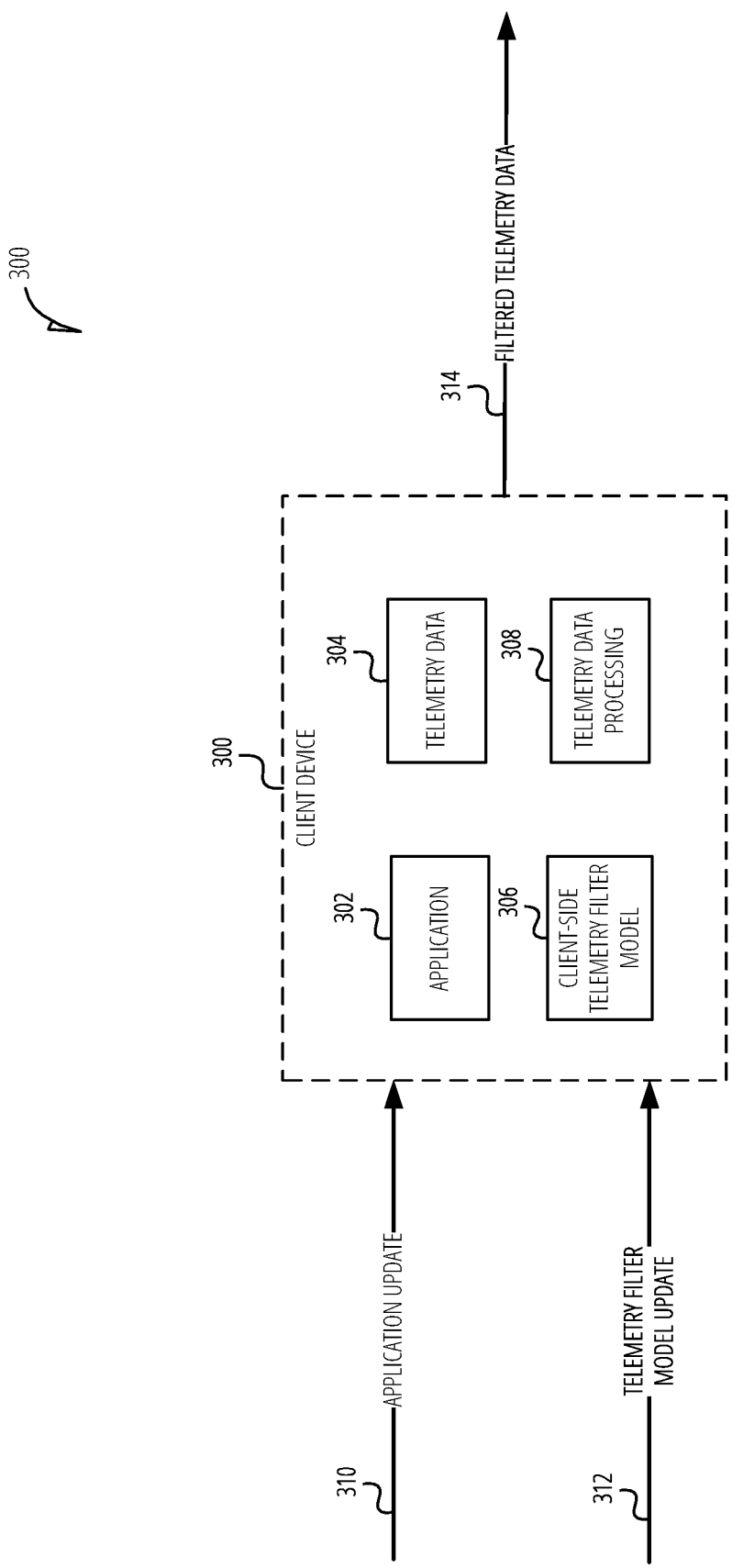
FIG. 3 is a schematic diagram of components in a client device, according to various examples.

FIG. 3 is a schematic diagram of components in a client device 300, according to various examples. The client device 300 comprises an application 302, a telemetry data 304, a client-side telemetry filter model 306, a telemetry data processing 308, an application update 310, a telemetry filter model update 312, and a filtered telemetry data 314.

In various examples, client device 300 is client device such as client device 106 as described in FIG. 1. Additionally, while not illustrated, client device 300 may include additional component such as a processing system and storage device with functionality as described for processing system 216 and data storage 206 in FIG. 2.

Application 302 may represent the application that is executing for which telemetry data is being generated and transmitted to federated system health server 102. In various examples, the application may be a productivity application such as a word processor or spreadsheet editor. Application 302 may have been received from application server 104. Additionally, periodic updates may be received for the application such as application update 310. These updates may be pushed to client device 300 or may be requested from a user. Client device 300 may also communicate filtered telemetry data 314 to federated system health server 102 and receive telemetry filter model update 312 from federated system health server 102.

Client-side telemetry filter model 306 may represent the telemetry filter model that used to determine whether to transmit filtered telemetry data 314. Telemetry data 304 maybe the unfiltered telemetry data that is collected during execution of application 302. Accordingly, the volume (e.g., data size) of telemetry data 304 may be greater than the volume of filtered telemetry data 314. telemetry data may include several data points. These data points may include, but are not limited to, the application build number, the operating system being used, screen size display, active threads being executed by the processor related to functions of the application. and data values that had been collected by application 302 during execution.

Telemetry data processing 308 may process errors of application 302 using client-side telemetry filter model 306 to determine if telemetry data should be sent to an external device such as federated system health server 102. An example of this process is discussed with respect to FIG. 4.

FIG. 4 is a dataflow diagram 400 illustrating a method for processing application errors, according to various examples. The method may be performed using the components of a client device such as client device 300. The method is organized into three columns: column 436 representing actions taken by the application; column 438, which represents a representation of the model used for calculations; and column 440 which represents the output of the model.

In various examples, a user may open the application and begin using it for a task, such as drafting a resume. After a period of time, an error such as, error 402, may occur. The error may be the application unexpectedly crashing.

The error may have an identifier. The identifier may be used to generate input vector 404. For example, model 406 is a six-component vector. Each component of the vector make correspond to an identifier of an error. The value of each of these components may represent an importance weight for the respective component. Accordingly, model 406 shows that the 1st, 4th and 5th components having no weight—whereas the 2nd, 3rd, and 6th components have values of 1, 3, and 5, respectively. For simplicity, model 406 does not show components that may be associated with other telemetry data such as the operating system, device data etc. Similarly, input vector 404 does not show values for other types of telemetry data that be used a vector format in input vector 404 such as what actions the user was taking at the time of the error, etc. The telemetry data may also be anonymous such that it cannot be linked back to a specific user, only a cohort (e.g., a device type, build version, specific test group identifier, etc.).

In various examples, a crash of an application may be associated with multiple errors. In this case, there were three errors with identifiers that corresponded to the 1st, 2nd, and 5th places of the vector. Accordingly, telemetry data processing 308 may generate input vector 404 (e.g., using a lookup table that maps error identifiers to vector component locations) with a positive value in each of these components. Although the input vector 404 is shown with one's for the positive value, other values may also be used. For example, the value may correspond to a severity of the error as determined by debugging code present in application 302. Furthermore, as discussed above, more complex input vectors may be used that include parameters of the application.

Model output 408 may be the result of using input vector 404 and model 406. For example, model output 408 may be the value of the telemetry data processing 308 dot product between the input vector 404 and model 406. In this case, the result of the calculation is one. The output may be considered a significance value. A significance value may indicate the relative importance of the errors. For example, a threshold significance value may be used to determine whether to send telemetry data associated with the errors or, instead, to suppress sending the telemetry data. As discussed above, however other model types and determining significance may be used.

The threshold significance value may be received from federated system health server 102 with the model 406, and in other examples, the significance value may be received separately from any model—thereby allowing updates to the significance value threshold separately from the model itself. This may have the effect of lowering or increasing the overall volume of telemetry data sent to federated system health server 102 without adjusting any individual weights of a model.

Continuing the method, consider that the significance value threshold is currently a five. Because model output 408 is less than the significance value threshold, suppress action 410 is performed. Accordingly, instead of sending telemetry data associated with the error as would normally occur, telemetry data processing 308 indicates no telemetry is to be transmitted to federated system health server 102.

After a period of time, and after the user has reopened the application, error 412 may occur. Using the process described above, input vector 414 may be generated. As seen, input vector 414 has different values than input vector 404 indicating a different set of errors have been triggered. In this case, the 6th component of the vector now has a value of one. The model used for the calculation of the significance value (model 416), however, has remained the same. The result of a dot product calculation using input vector 414 and model 416 results in a calculated significance value of 6 (model output 418).

Assuming the significance value threshold has remained at five, transmit action 420 is performed by telemetry data processing 308 because the value of model output 418 is greater than five. Transmit action 420 may include transmitting telemetry data to federated system health server 102.

In various examples, model update action 422 includes receiving an updated model (e.g., model 424) from federated system health server 102. As illustrated, the 6th component of model 424 has been changed from five to a zero with respect to model 416. Subsequent to model update action 422, error 426 may occur and input vector 428 may be generated.

Input vector 428 is shown as the same as input vector 414. Model output 432, however, has significance value of one whereas model output 418 had a significance value of six. Thus, instead of transmitting telemetry data as was done after the first time this input vector was used (e.g., transmit action 420), the determination is made to perform suppress action 434 based on one being less than the significance value threshold of five.

Figure 5:
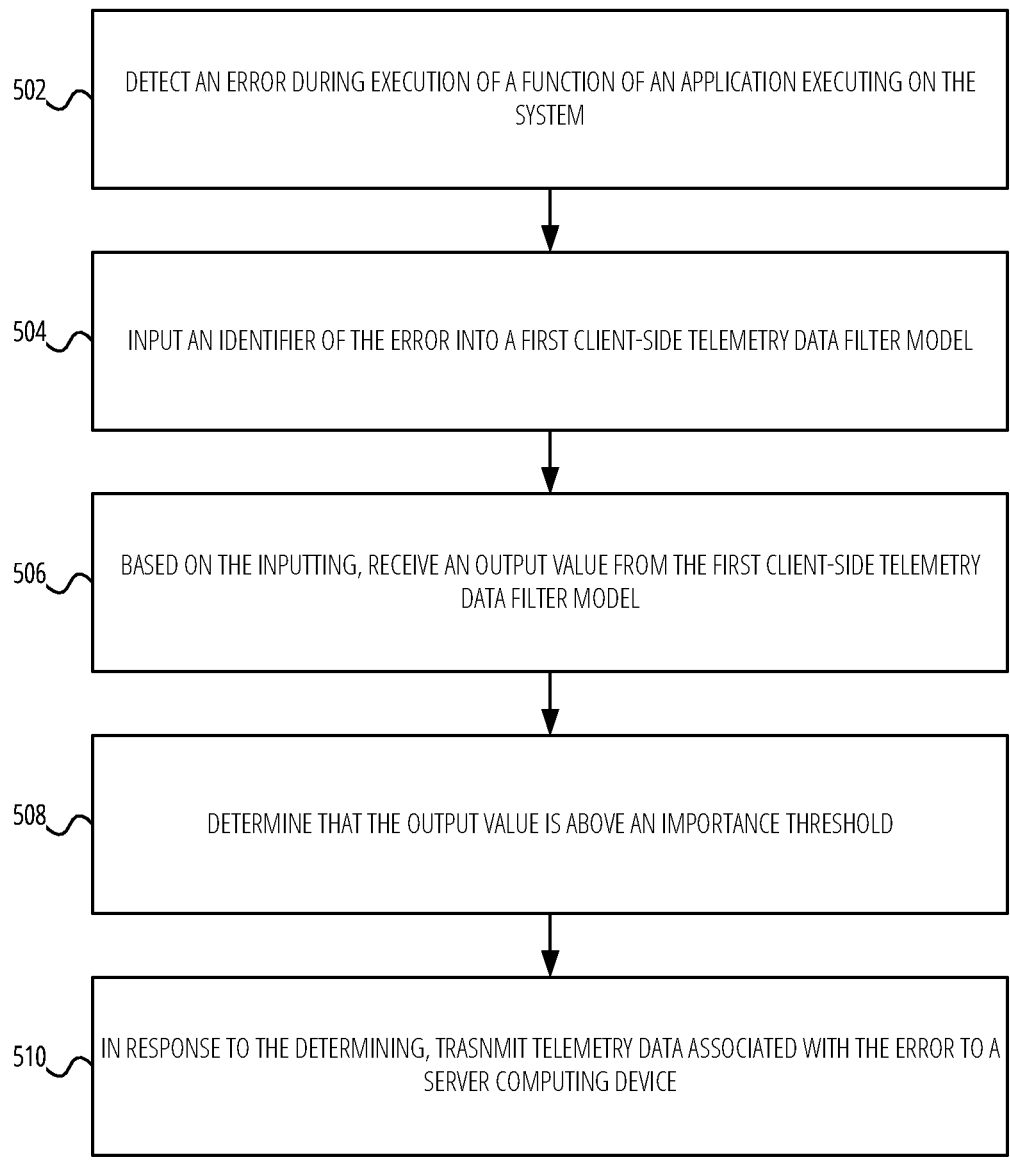
FIG. 5 is a flowchart diagram illustrating a method for processing application errors, according to various examples.

FIG. 5 is a flowchart illustrating a method to generate word embeddings, according to various examples. The method is represented as a set of blocks that describe operations 502-510 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 5. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 502, the method may include detecting an error during execution of a function of an application executing on the system. In various examples, the system may be a device such as client device 106. Detecting an error may include the application detecting an unexpected value for a function or the application crashing.

At operation 504, the method may include inputting an identifier of the error into a first client-side telemetry data filter model (e.g., client-side telemetry filter model 306). In various examples, inputting the identifier of the error into a first client-side telemetry data filter model may generating an input vector based on the detected error. For example, an error code lookup table may be accessed where the error code maps to a component (e.g., a location) in the first client-side telemetry data filter model. A value (e.g., a one) may be placed into the determined component location of the input vector to indicate the error was detected.

At operation 506, the method may include, based on the inputting, receiving an output value from the first client-side telemetry data filter model. For example, the output value may be based on a calculation performed with respect to the input vector and the first client-side telemetry data filter model as discussed above with respect to telemetry data processing 308 and client-side telemetry filter models 208. The output value may be expressed as a probability or an integer representing the significance of the error.

In various examples, the first client-side telemetry data filter model may include weights for a plurality of errors. An updated client-side telemetry data filter model may be received that lowers a weight of an error corresponding to the detected error. In various examples, the first client-side telemetry data filter model includes an expected frequency of a plurality of errors. The output of the first client-side telemetry data filter model may indicate a statistical value of how far above the detected error rate is for the error with respect to the executing application.

At operation 508, the method may include determining that the output value is above an importance threshold. For example, the client device may retrieve the importance threshold from a datastore and compare it to the output value.

At operation 510, the method may include, in response to the determining, transmitting telemetry data associated with the error to a server computing device (e.g., federated system health server 102). Telemetry data may include a build identifier of the application and the identification of the error. Other types of telemetry data may be transmitted as discussed herein.

In various examples, the method may also include receiving an updated client-side telemetry data filter model from the server computing device; detecting the error during a subsequent execution of the function of the application executing on the client system; inputting the identifier of the error into the updated client-side telemetry data filter model; based on the inputting into the updated client-side telemetry data filter model, receiving a second output value from the updated client-side telemetry data filter model; determining that the output value is below the importance threshold; and in response to the determining that the output value is below the importance threshold, suppressing transmission of telemetry data associated with the error to the server computing device.

The method may also include receiving an updated build of the application; detecting the error during execution of the updated build of the application; and transmitting telemetry data associated with the error detected during execution of the updated build of the application to the server computing device.

Figure 6:
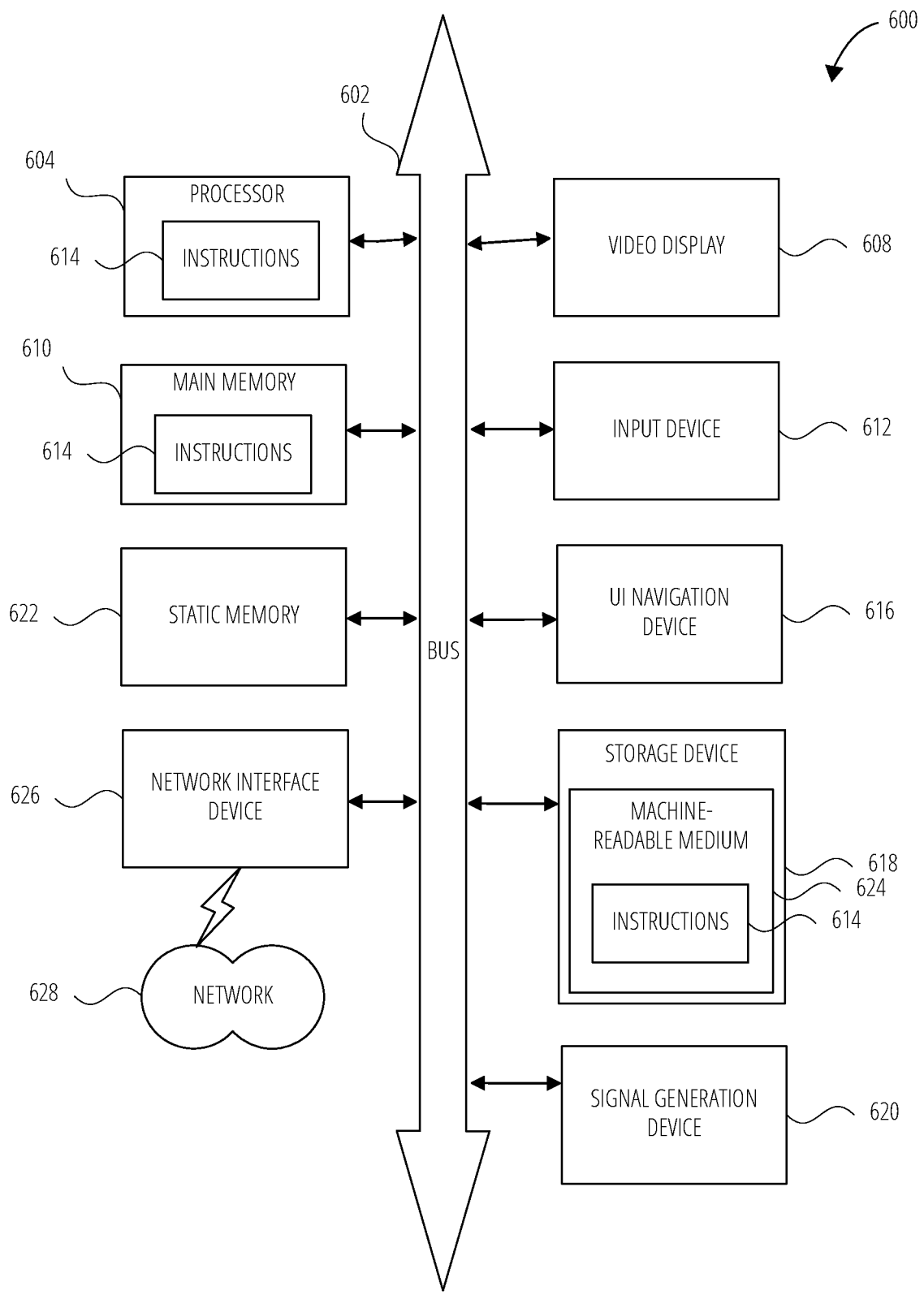
FIG. 6 is a block diagram illustrating a machine in the example form of computer system, within which a set or sequence of instructions may be executed to cause the machine to perform any one of the methodologies discussed herein, according to various examples.

FIG. 6 is a block diagram illustrating a machine in the example form of computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 604 (e.g., a central processing unit (CPU), a graphics processing unit (GPU) or both, processor cores, compute nodes, etc.), a main memory 610 and a static memory 622, which communicate with each other via a bus 602. The computer system 600 may further include a video display 608, an input device 612 (e.g., a keyboard), and a user interface (UI) navigation device 614 (e.g., a mouse). In one embodiment, the video display 608, input device 612, and UI navigation device 616 are incorporated into a single device housing such as a touch screen display. The computer system 600 may additionally include a storage device 618 (e.g., a drive unit), a signal generation device 620 (e.g., a speaker), a network interface device 626, and one or more sensors (not shown), such as a global positioning system (GPS) sensor, compass, accelerometer, or other sensors.

The storage device 618 includes a machine-readable medium 624 on which is stored one or more sets of data structures and instructions 614 (e.g., software) embodying or utilized by any one or more of the methodologies or functions described herein. The instructions 614 may also reside, completely or at least partially, within the main memory 610, static memory 622, and/or within the processor 604 during execution thereof by the computer system 100, with the main memory 610, static memory 622, and the processor 604 also constituting machine-readable media.

While the machine-readable medium 624 is illustrated in an example embodiment to be a single medium, the term "machine-readable medium" may include a single medium or multiple media (e.g., a centralized or distributed Database, and/or associated caches and servers) that store the one or more instructions 614. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 624 that excluded transitory signals.

The instructions 614 may further be transmitted or received over a communications network 628 using a transmission medium via the network interface device 626 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software Example 1 is a client system comprising: at least one processor; a storage device comprising instructions, which when executed by the at least one processor, configure the client system to perform operations comprising: detecting an error during execution of a function of an application executing on the system; inputting an identifier of the error into a first client-side telemetry data filter model; based on the inputting, receiving an output value from the first client-side telemetry data filter model; determining that the output value is above an importance threshold; and in response to the determining, transmitting telemetry data associated with the error to a server computing device.

In Example 2, the subject matter of Example 1 optionally includes wherein the instructions, which when executed by the at least one processor, further configure the client system to perform operations comprising: receiving an updated client-side telemetry data filter model from the server computing device; detecting the error during a subsequent execution of the function of the application executing on the client system; inputting the identifier of the error into the updated client-side telemetry data filter model; based on the inputting into the updated client-side telemetry data filter model, receiving a second output value from the updated client-side telemetry data filter model; determining that the output value is below the importance threshold; and in response to the determining that the output value is below the importance threshold, suppressing transmission of telemetry data associated with the error to the server computing device.

In Example 3, the subject matter of Example 2 optionally includes wherein the instructions, which when executed by the at least one processor, further configure the client system to perform operations comprising: receiving an updated build of the application; detecting the error during execution of the updated build of the application; and transmitting telemetry data associated with the error detected during execution of the updated build of the application to the server computing device.

In Example 4, the subject matter of any one or more of Examples 2-3 optionally include wherein the first client-side telemetry data filter model includes weights for a plurality of errors and wherein the updated client-side telemetry data filter model lowers a weight of an error corresponding to the detected error.

In Example 5, the subject matter of any one or more of Examples 1-4 optionally include wherein the telemetry data include a build identifier of the application and an identification of the error.

In Example 6, the subject matter of any one or more of Examples 1-5 optionally include wherein inputting the identifier into the first client-side telemetry data filter model includes: generating an input vector based on the detected error.

In Example 7, the subject matter of Example 6 optionally includes wherein generating an input vector based on the detected error includes: accessing an error code lookup table, the error code lookup table mapping an error code to a component in the first client-side telemetry data filter model.

Example 8 is a method comprising: detecting an error during execution of a function of an application executing on a system; inputting an identifier of the error into a first client-side telemetry data filter model; based on the inputting, receiving an output value from the first client-side telemetry data filter model; determining that the output value is above an importance threshold; and in response to the determining, transmitting telemetry data associated with the error to a server computing device.

In Example 9, the subject matter of Example 8 optionally includes receiving an updated client-side telemetry data filter model from the server computing device; detecting the error during a subsequent execution of the function of the application executing on the client system; inputting the identifier of the error into the updated client-side telemetry data filter model; based on the inputting into the updated client-side telemetry data filter model, receiving a second output value from the updated client-side telemetry data filter model; determining that the output value is below the importance threshold; and in response to the determining that the output value is below the importance threshold, suppressing transmission of telemetry data associated with the error to the server computing device.

In Example 10, the subject matter of Example 9 optionally includes receiving an updated build of the application; detecting the error during execution of the updated build of the application; and transmitting telemetry data associated with the error detected during execution of the updated build of the application to the server computing device.

In Example 11, the subject matter of any one or more of Examples 9-10 optionally include wherein the first client-side telemetry data filter model includes weights for a plurality of errors and wherein the updated client-side telemetry data filter model lowers a weight of an error corresponding to the detected error.

In Example 12, the subject matter of any one or more of Examples 8-11 optionally include wherein the telemetry data include a build identifier of the application and an identification of the error.

In Example 13, the subject matter of any one or more of Examples 8-12 optionally include wherein inputting the identifier into the first client-side telemetry data filter model includes: generating an input vector based on the detected error.

In Example 14, the subject matter of Example 13 optionally includes wherein generating an input vector based on the detected error includes: accessing an error code lookup table, the error code lookup table mapping an error code to a component in the first client-side telemetry data filter model.

Example 15 is a computer-readable medium comprising instructions, which when executed by at least one processor, configure the at least one processor to perform operations comprising: detecting an error during execution of a function of an application executing on a system; inputting an identifier of the error into a first client-side telemetry data filter model; based on the inputting, receiving an output value from the first client-side telemetry data filter model; determining that the output value is above an importance threshold; and in response to the determining, transmitting telemetry data associated with the error to a server computing device.

In Example 16, the subject matter of Example 15 optionally includes wherein the instructions, which when executed by the at least one processor, further configure the at least one processor to perform operations comprising: receiving an updated client-side telemetry data filter model from the server computing device; detecting the error during a subsequent execution of the function of the application executing on the client system; inputting the identifier of the error into the updated client-side telemetry data filter model; based on the inputting into the updated client-side telemetry data filter model, receiving a second output value from the updated client-side telemetry data filter model; determining that the output value is below the importance threshold; and in response to the determining that the output value is below the importance threshold, suppressing transmission of telemetry data associated with the error to the server computing device.

In Example 17, the subject matter of Example 16 optionally includes wherein the instructions, which when executed by the at least one processor, further configure the at least one processor to perform operations comprising: receiving an updated build of the application; detecting the error during execution of the updated build of the application; and transmitting telemetry data associated with the error detected during execution of the updated build of the application to the server computing device.

In Example 18, the subject matter of any one or more of Examples 16-17 optionally include wherein the first client-side telemetry data filter model includes weights for a plurality of errors and wherein the updated client-side telemetry data filter model lowers a weight of an error corresponding to the detected error.

In Example 19, the subject matter of any one or more of Examples 15-18 optionally include wherein the telemetry data include a build identifier of the application and an identification of the error.

In Example 20, the subject matter of any one or more of Examples 15-19 optionally include wherein inputting the identifier into the first client-side telemetry data filter model includes: generating an input vector based on the detected error.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein

What is claimed is:

1. A client system comprising:
    at least one processor; and
    a storage device comprising instructions, which, when executed by the at least one processor, configure the client system to perform operations comprising:
        detecting a first occurrence of a first error during execution of a function of an application executing on the system;
        generating a first input vector for inputting to a first client-side telemetry data filter model by accessing an error code lookup table with an error code of the first error, the error code lookup table mapping a plurality of error codes to individual components in the input vector, wherein the first client-side telemetry data filter model comprises a vector with each component representing a weight indicating an importance of a respective error;
        inputting the first input vector into the first client-side telemetry data filter model;
        based on the inputting, receiving a first output value from the first client-side telemetry data filter model;
        determining that the first output value is above an importance threshold; and
        in response to the determining, transmitting telemetry data associated with the first occurrence of the first error to a server computing device.

2. The client system of claim 1, wherein the instructions, when executed by the at least one processor, further configure the client system to perform operations comprising:
    receiving an updated client-side telemetry data filter model from the server computing device;
    detecting a second occurrence of the first error during a subsequent execution of the function of the application executing on the client system;
    generating a second input vector for inputting to the updated client-side telemetry data filter model by accessing the error code lookup table with the error code of the first error;
    inputting the second input vector into the updated client-side telemetry data filter model;
    based on the inputting into the updated client-side telemetry data filter model, receiving a second output value from the updated client-side telemetry data filter model;
    determining that the second output value is below the importance threshold; and
    in response to the determining that the second output value is below the importance threshold, suppressing transmission of telemetry data associated with the second occurrence of the first error to the server computing device.

3. The client system of claim 2, wherein the instructions, when executed by the at least one processor, further configure the client system to perform operations comprising:
    receiving an updated build of the application;
    detecting a third occurrence of the first error during execution of the updated build of the application; and
    transmitting telemetry data associated with the third occurrence of the first error detected during execution of the updated build of the application to the server computing device.

4. The client system of claim 2, wherein the first client-side telemetry data filter model includes weights for a plurality of errors and wherein the updated client-side telemetry data filter model lowers a weight of an error corresponding to the detected error.

5. The client system of claim 1, wherein the telemetry data include a build identifier of the application and an identification of the error.

6. The client system of claim 1, wherein the first output value is calculated by:
    multiplying each component of the first input vector with a corresponding component of the vector of the first client-side telemetry data filter model to generate a set of multiplied components; and
    calculating a sum of the set of multiplied components to generate the first output value.

7. A method comprising:
    detecting a first occurrence of a first error during execution of a function of an application executing on a client system;
    generating a first input vector for inputting to a first client-side telemetry data filter model by accessing an error code lookup table with an error code of the first error, the error code lookup table mapping a plurality of error codes to individual components in the input vector, wherein the first client-side telemetry data filter model comprises a vector with each component representing a weight indicating an importance of a respective error;
    inputting the input vector into the first client-side telemetry data filter model;
    based on the inputting, receiving a first output value from the first client-side telemetry data filter model;
    determining that the first output value is above an importance threshold; and
    in response to the determining, transmitting telemetry data associated with the first occurrence of the first error to a server computing device.

8. The method of claim 7, further comprising:
    receiving an updated client-side telemetry data filter model from the server computing device;
    detecting a second occurrence of the first error during a subsequent execution of the function of the application executing on the client system;
    generating a second input vector for inputting to the updated client-side telemetry data filter model by accessing the error code lookup table with the error code of the first error;
    inputting the second input vector into the updated client-side telemetry data filter model;
    based on the inputting of the second input vector into the updated client-side telemetry data filter model, receiving a second output value from the updated client-side telemetry data filter model;
    determining that the second output value is below the importance threshold; and
    in response to the determining that the second output value is below the importance threshold, suppressing transmission of telemetry data associated with the second occurrence of the error to the server computing device.

9. The method of claim 8, further comprising:
    receiving an updated build of the application;

detecting a third occurrence of the first error during execution of the updated build of the application; and transmitting telemetry data associated with the third occurrence of the first error detected during execution of the updated build of the application to the server computing device.

10. The method of claim 8, wherein the first client-side telemetry data filter model includes weights for a plurality of errors and wherein the updated client-side telemetry data filter model lowers a weight of an error corresponding to the detected error.

11. The method of claim 7, wherein the telemetry data include a build identifier of the application and an identification of the error.

12. A non-transitory computer-readable medium comprising instructions, which, when executed by at least one processor, configure the at least one processor to perform operations comprising:

detecting a first occurrence of a first error during execution of a function of an application executing on a client system;

generating a first input vector for inputting to a first client-side telemetry data filter model by accessing an error code lookup table with an error code of the first error, the error code lookup table mapping a plurality of error codes to individual components in the input vector, wherein the first client-side telemetry data filter model comprises a vector with each component representing a weight indicating an importance of a respective error;

inputting the first input vector into the first client-side telemetry data filter model;

based on the inputting of the first input vector, receiving a first output value from the first client-side telemetry data filter model;

determining that the first output value is above an importance threshold; and in response to the determining, transmitting telemetry data associated with the first occurrence of the first error to a server computing device.

13. The non-transitory computer-readable medium of claim 12, wherein the instructions, when executed by the at least one processor, further configure the at least one processor to perform operations comprising:

receiving an updated client-side telemetry data filter model from the server computing device;

detecting a second occurrence of the first error during a subsequent execution of the function of the application executing on the client system;

generating a second input vector for inputting to the updated client-side telemetry data filter model by accessing the error code lookup table with the error code of the first error;

inputting the second input vector into the updated client-side telemetry data filter model;

based on the inputting into the updated client-side telemetry data filter model, receiving a second output value from the updated client-side telemetry data filter model;

determining that the second output value is below the importance threshold; and in response to the determining that the second output value is below the importance threshold, suppressing transmission of telemetry data associated with the second occurrence of the error to the server computing device.

14. The non-transitory computer-readable medium of claim 13, wherein the instructions, when executed by the at least one processor, further configure the at least one processor to perform operations comprising:

receiving an updated build of the application;

detecting a third occurrence of the first error during execution of the updated build of the application; and transmitting telemetry data associated with the third occurrence of the error detected during execution of the updated build of the application to the server computing device.

15. The non-transitory computer-readable medium of claim 13, wherein the first client-side telemetry data filter model includes weights for a plurality of errors and wherein the updated client-side telemetry data filter model lowers a weight of an error corresponding to the detected error.

16. The non-transitory computer-readable medium of claim 12, wherein the telemetry data include a build identifier of the application and an identification of the error.

17. The non-transitory computer-readable medium of claim 12, wherein the first output value is calculated by:

multiplying each component of the first input vector with a corresponding component of the vector of the first client-side telemetry data filter model to generate a set of multiplied components; and calculating a sum of the set of multiplied components to generate the first output value.

* * * * *